United States Patent Office
3,007,905
Patented Nov. 7, 1961

3,007,905
PROPYLENE POLYMERIZATION PROCESS
Grant C. Bailey, Bartlesville, Okla., assignor to Phillips Petroleum Company, a corporation of Delaware
No Drawing. Filed Mar. 21, 1958, Ser. No. 722,841
1 Claim. (Cl. 260—93.7)

This invention relates to an improved catalyst and a method for preparing such a catalyst. In another aspect, the invention relates to an improved polymerization process.

It is already known to convert aliphatic 1-olefins to normally solid polymers by contacting with a supported chromium oxide catalyst in which part of the chromium is hexavalent. Such a process is described in U.S. Patent 2,825,721 (1958).

An object of the present invention is to provide a method for producing an improved chromium oxide catalyst. Another object is to provide a method for preparing a chromium oxide catalyst having increased activity for the conversion of propylene and higher olefins to solid polymers. A further object of the invention is to provide an improved process for converting olefins such as propylene to solid polymer in increased yields. Additional objects and advantages will become apparent to those skilled in the art upon examination of this disclosure.

According to this invention, an improved catalyst is provided by treating an active chromium oxide polymerization catalyst, capable of catalyzing the conversion of 1-olefins to solid polymer, with chlorine, which displaces part of the oxygen combined with the chromium from chemical combination with said chromium. The resulting catalyst is characterized by increased activity for the conversion of 1-olefins such as propylene to increased yields of solid polymer.

The type of catalyst to which the present invention is applicable is a catalyst comprising chromium oxide, in which at least part, generally at least 0.1 weight percent, based on total catalyst, of the chromium is in the hexavalent state, the chromium oxide being associated with, e.g. supported on, at least one support material selected from the group consisting of silica, alumina, zirconia and thoria. The catalyst can be prepared by mixing a chromium compound, either in the form of a dry solid or an aqueous solution, with the defined support material and subsequently activating. The chromium compounds utilized are those which are readily calcinable to chromium oxide. Preferred chromium compounds are chromic nitrate and chromium trioxide, although other chromium compounds convertible to oxides can be utilized. In one method of preparation, an aqueous solution of chromium trioxide or chromic nitrate is brought into contact with the support material, allowed to stand for a short time, and the excess removed. The resulting composite is dried, e.g. at a temperature up to about 300° F., and is preferably activated by heating in a nonreducing atmosphere at a temperature in the range 500 to 1500° F. for a time in the range of about 1 minute to about 50 hours. The atmosphere in which the catalyst is activated can be made up of nitrogen or other inert gas, but preferably contains some oxygen. It is preferred that the activation atmosphere be substantially anhydrous, i.e. that it have a dew point below 0° F. A highly suitable activation atmosphere is anhydrous air. Although reducing gases can be present in the activation atmosphere, it is essential that they not be allowed to reduce all of the hexavalent chromium present. It is much preferred that reducing agents be absent. Ordinarily, the catalyst is activated by heating in oxygen or air at a temperature in the range 750 to 1300° F. for a period in the range 1 to 10 hours. A preferred support material is silica-alumina gel of the type known in the art for use as a cracking catalyst. Preferably, the major component of the support is silica. Highly desirable supports are silica-alumina gels containing from 80 to 95 weight percent silica, the remainder being substantially entirely alumina.

In accordance with my invention, the catalyst activated as described is treated with chlorine which removes part of the oxygen, by displacement, by combination with the chromium.

The catalyst treatment in accordance with my invention is regulated so that not all of the oxygen combined with the chromium is displaced. In general, the catalyst contains up to about 50 weight percent chromium in the form of oxide. Ordinarily, however, the chromium content will be less than 30 weight percent, and, in many cases, will be in the range 1 to 10 weight percent. The proper amount of treating agent to use in any particular case can readily be determined by those skilled in the art by mere routine test and calculation.

The conditions of treatment of the catalyst in accordance with my invention include a temperature in the range 70 to 900° F. and a time sufficient to displace part but not all of the oxygen from combination with the chromium. It is preferred that the temperature of treatment be approximately the same as that to be used in the subsequent olefin polymerization, as subsequently described herein. I have found that regulation of the amount of time of treatment is facilitated when the treating agent is utilized in the gaseous phase. This will necessarily result in the preferred pressure being rather low. The time of treatment is controlled in accordance with the temperature and pressure so that not all of the oxygen is displaced from combination with the chromium. Ordinarily, a time in the range of 1 to 30 minutes is suitable, the longer times within the range being utilized at the lower temperatures in the range specified. It is generally preferred that at least 10 percent but not more than 75 percent of the total chromium enter into combination with the treating agent. Preferably, from about 25 to about 50 percent of the chromium should enter into combination with the treating agent displacing oxygen. This degree of treatment can be obtained by controlling the time of treatment in accordance with analyses of the treated catalyst for chromium and chlorine or other treating agent. Alternatively, a total amount of treating agent which represents a stoichiometric deficiency with respect to the total chromium in the catalyst can be used.

After the activated catalyst has been treated with the reagent in accordance with my invention, the excess reagent is removed from contact with the catalyst. This can be accomplished by sweeping the excess reagent away with an inert gas or by placing the catalyst in a vacuum. The catalyst thus treated is maintained out of contact with the atmosphere and moisture until it is used in the polymerization, which is subsequently discussed herein.

The catalyst prepared in accordance with my invention can be utilized for the conversion of aliphatic 1-olefins to solid polymers which are useful wherever solid polymers of olefins generally are used. Thus the polymers can be shaped into various objects such as bottles, tumblers, and the like. Alternatively, the polymers can be drawn to form strong fibers or can be fabricated into films which can be utilized in the packaging arts.

The monomers which are polymerizable to solid polymer in accordance with my invention are, in general, the aliphatic 1-olefins having from 2 to 8 carbon atoms per molecule and no branching nearer the double bond than the 4-position. Preferred monomers within this class are those having from 3 to 6 carbon atoms per molecule. Particular monomers which are polymerizable in accordance with my invention, in a preferred form, include propylene, 1-butene, 1-pentene, 4-methyl-1-pentene, and 1-hexene. Other monomers which can be polymerized to solid polymers in accordance with my invention include ethylene, 4-methyl-1-hexene, 1,3-butadiene and isoprene.

The conditions of polymerization are substantially the same as those described in U.S. Patent 2,825,721. Thus, the temperature is generally in the range 100 to 500° F., preferably 150 to 375° F. When the 1-olefin of the class described contains from 3 to 6 carbon atoms per molecule, a preferred polymerization temperature range is 150 to 250° F.

Although not absolutely necessary, it is generally preferred that the olefin be polymerized in diluted form. Suitable diluents include those hydrocarbons which are inert and nondeleterious toward the catalyst under the polymerization conditions. Preferred diluents are the paraffinic and cycloparaffinic hydrocarbons, especially paraffinic hydrocarbons having from 3 to 12 carbon atoms per molecular and naphthenic hydrocarbons having from 5 to 12 carbon atoms per molecule. It is preferred that the diluent be liquid under the conditions of polymerization and a pressure sufficient to maintain the diluent susbtantially in the liquid phase is generally preferred. Pressures greatly in excess of this amount are not absolutely necessary but can be utilized. Alternatively, the polymerization can be conducted at relatively low pressures with the monomer totally in the gaseous phase. In addition, the process can be conducted with part of the monomer in the gaseous and part in the liquid phase or, the process can be conducted with the monomer, substantially undiluted, in the liquid phase.

Catalysts can be utilized in the form of a fixed bed or in mobile form. One suitable catalytic technique is to suspend the catalyst, in finely divided form, e.g. from 60 mesh to several microns in particle size, in the reaction mixture in the reactor. Thus, the catalyst can be supplied to the reactor as a slurry in the diluent. The monomer is added in the desired concentration, usually 20 percent or less, based on total feed, and the entire mixture is stirred or agitated in the reactor. After a suitable residence time, usually in the range 10 minutes to 6 hours, the reaction mixture is withdrawn from the reactor, unreacted monomer is removed, e.g. by venting, and the mixture is filtered to remove the catalyst. The filtration is conducted at such a temperature (usually reactor temperature or up to about 50° higher) that the product polymer remains substantially entirely in solution in the diluent. The polymer can then be recovered from the filtrate, by cooling to precipitate the polymer or any desired fraction thereof or by vaporization of the diluent. The total polymer can be fractionated to obtain fractions having different properties. Thus the polymer can be extracted with boiling normal heptane, or similar solvent, at atmospheric pressure and the insoluble fraction of the polymer isolated. This insoluble fraction, especially in the case of polypropylene, is crystalline and has a relatively high melting point, e.g. of the order of 300° F. This fraction is particularly useful for applications wherein a heat-resistant thermoplastic is desired. The soluble fraction can be further fractionated to recover an oily fraction which is soluble in methylisobutyl ketone and a tacky fraction which is insoluble in methylisobutyl ketone. Further fractionation of the polymer or its fractions by solvent extraction or molecular distillation can be conducted as desired.

In a specific embodiment of my invention, a silica-alumina gel composite, containing approximately 87 weight percent silica and the remainder alumina, was immersed in an approximately 1 molar aqueous solution of chromium trioxide and allowed to stand for several minutes. The excess liquid was drained and the impregnated solid composite was dried at approximately 300° F. for several hours. The dried composite was then heated in substantially anhydrous air (dew point below 0° F.) for approximately 6 hours at about 500° C. The catalyst was then further heated at 400° C. for approximately 6 hours in a stream of nitrogen. After the nitrogen treatment, excess nitrogen was removed by evacuation to about 1 mm. Hg. This catalyst was compared with a catalyst prepared in the same manner but with the following additional treatment. (Each catalyst tested had a total chromium content of 2.8 weight percent prior to chlorine treatment. Substantially all of this chromium was in the hexavalent state.)

Five grams of the catalyst prepared as just described was treated with 50 cc. of gaseous elemental chlorine at atmospheric pressure for a period of 5 minutes at 250° F. The elemental chlorine was in the gaseous phase under these conditions. The resulting catalyst was then placed in a gas-tight vessel which was subsequently connected to a vacuum pump and evacuated. This catalyst was compared with catalysts prepared in the same manner except without chlorine treatment.

In a series of runs, catalysts prepared as previously described herein were contacted with ethylene and with propylene at a temperature of 250° F. for several hours at an absolute pressure of 450 millimeters of mercury. The olefin was in the gaseous phase under these conditions. Solid polymer was obtained in each case.

The increased activity of the chlorine-treated catalyst is illustrated by the following results, which are analyses of gases recovered by placing the catalyst which remained after each of the runs in a gas-tight vessel, under low pressure, and recovering and analyzing the gases adsorbed. The composition of these gases is shown in the following tabulation:

| Residual Gas Composition, Volume Percent | Ethylene Contacted with Catalyst not Treated with Chlorine | Propylene Contacted with Catalyst not Treated with Chlorine | Propylene Contacted with Catalyst Treated with Chlorine |
| --- | --- | --- | --- |
| $H_2$ | 3 | 8 | 6 |
| $N_2$ | 96 | 18 | 61 |
| $CH_4$ | | 0.3 | 0.3 |
| $C_2H_4$ | <0.1 | | |
| $C_2H_6$ | 1 | 0.7 | |
| $C_3H_6$ | | 61 | 25 |
| $C_3H_8$ | | 12 | 7 |
| Hexenes | | 0.2 | |

Comparing the two tests with propylene in the foregoing table, it will be noted that when the catalyst had not been treated with chlorine the nitrogen content of the residual gas was relatively low whereas the propylene content of the residual gas was relatively high. These results indicate that the propylene was rather tightly adsorbed on the catalyst. However, when the catalyst was treated with chlorine, the nitrogen content of the residual gas was 61 percent, as compared with 18 percent when no chlorine treatment was used. In addition, the residual gas on the chlorine-treated catalyst contained only 25 percent propylene, as compared with 61 percent when no chlorine treatment had been used. This indicates a looser adsorption of propylene on the catalyst and higher conversion to polymer.

Another important observation in connection with the foregoing table is that the hydrogen content of the residual gas was decreased from 8 to 6 percent by the chlorine treatment and the propane content was decreased from 12 to 7 percent. These data indicate that the chlorine treatment of the catalyst results in a suppression of side reactions such as hydrogen transfer and the like.

In another specific embodiment of my invention, a chlorine-treated catalyst prepared as described in the foregoing specific embodiment, is utilized to convert propylene to solid polymer at a temperature of 225° F. The catalyst is utilized in the form of a powder sufficiently fine to pass through a 100 mesh screen and is suspended, in the form of a 1 percent solids slurry in cyclohexane and passed into a reactor provided with a stirrer. A separate stream of propylene is supplied to the reactor in a sufficient amount to make a propylene content in the feed of approximately 12 weight percent.

The reaction mixture is mechanically stirred. The reactor contents are maintained under a pressure sufficient to maintain substantially all of the hydrocarbon in the liquid phase. A residence time of 2 hours is utilized. Reactor contents are continuously withdrawn into a flash zone in which unreacted propylene is vented. The remaining material is heated at a temperature of approximately 250° F. and filtered under pressure to remove the catalyst. The filtrate is passed to a vacuum distillation zone in which the cyclohexane is removed. The polymer can be extracted with methylisobutyl ketone to remove an oily fraction which can be utilized as a lubricant or a lubricant additive. The residue can be extracted with boiling normal heptane to isolate an insoluble crystalline residue which is useful as a thermoplastic material for the production of molded articles, films, and fibers. The fraction soluble in the normal heptane can be utilized as a lubricating oil additive or a wax substitute. It can also be further fractionated to obtain a normally solid amorphous fraction which can be used to produce molded articles.

Although certain process steps, examples, structures, and compositions have been described for purposes of illustration, it is evident that the invention is not limited thereto. Thus it will be clear to one skilled in the art that the various monomers can be copolymerized with each other.

I claim:

A process for converting propylene to normally solid polymer which comprises contacting said propylene, with a catalyst prepared by impregnating a hilica-alumina composite with chromium oxide, heating in a substantially anhydrous atmosphere at an elevated temperature to impart polymerization activity to said catalyst, treating the resulting catalyst with elemental chlorine at a temperature in the range 150 to 250° F. and at a time in the range 1 to 30 minutes to displace from 10 to 75 percent of the combined oxygen from combination with said chromium, and removing excess chlorine from contact with the catalyst, said polymerization process being conducted at a temperature within the range 150 to 250° F.

References Cited in the file of this patent

UNITED STATES PATENTS

| | | |
|---|---|---|
| 2,154,527 | Pier et al. | Apr. 18, 1939 |
| 2,726,234 | Field et al. | Dec. 6, 1956 |
| 2,753,310 | Riedl | July 3, 1956 |
| 2,824,089 | Peters et al. | Feb. 18, 1958 |
| 2,825,721 | Hogan et al. | Mar. 4, 1958 |